(12) United States Patent
Nakamura

(10) Patent No.: US 10,225,425 B2
(45) Date of Patent: Mar. 5, 2019

(54) INFORMATION PROCESSING APPARATUS AND METHOD FOR CONTROLLING THE SAME

(71) Applicant: CANON KABUSHIKI KAISHA, Tokyo (JP)

(72) Inventor: Shuichi Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/700,719

(22) Filed: Sep. 11, 2017

(65) Prior Publication Data

US 2018/0084128 A1 Mar. 22, 2018

(30) Foreign Application Priority Data

Sep. 21, 2016 (JP) ................................. 2016-184687

(51) Int. Cl.
  *H04N 1/00* (2006.01)
  *H04N 1/21* (2006.01)
  *H04N 1/405* (2006.01)

(52) U.S. Cl.
  CPC ....... *H04N 1/00896* (2013.01); *H04N 1/2104* (2013.01); *H04N 1/00832* (2013.01); *H04N 1/405* (2013.01); *H04N 2201/0094* (2013.01)

(58) Field of Classification Search
  CPC ................................................ H04N 1/00896
  See application file for complete search history.

(56) References Cited

U.S. PATENT DOCUMENTS

| 5,687,382 | A | * | 11/1997 | Kojima | G06F 1/3275 |
| | | | | | 365/227 |
| 5,860,110 | A | | 1/1999 | Fukui et al. | |
| 5,933,261 | A | | 8/1999 | Fukui et al. | |
| 6,021,472 | A | | 2/2000 | Hamaguchi et al. | |
| 8,385,134 | B2 | | 2/2013 | Yamaki | |
| 8,928,676 | B2 | * | 1/2015 | Steiner | G06T 15/005 |
| | | | | | 345/505 |
| 9,509,885 | B2 | | 11/2016 | Nakamura | |
| 9,557,790 | B2 | * | 1/2017 | Yamaki | G11C 5/148 |
| 9,620,072 | B2 | * | 4/2017 | Ben-Harrush | G06F 1/3218 |
| 2006/0233036 | A1 | * | 10/2006 | Blodgett | G11C 7/1072 |
| | | | | | 365/230.01 |
| 2007/0255929 | A1 | * | 11/2007 | Kasahara | G06F 1/3203 |
| | | | | | 712/1 |
| 2010/0149900 | A1 | * | 6/2010 | Kitayama | G11C 8/08 |
| | | | | | 365/230.03 |
| 2012/0274989 | A1 | * | 11/2012 | Haruta | H04N 1/506 |
| | | | | | 358/448 |

(Continued)

FOREIGN PATENT DOCUMENTS

JP 2012-094228 A 5/2012
JP 2014-201034 A 10/2014

*Primary Examiner* — Ted W Barnes
(74) *Attorney, Agent, or Firm* — Venable LLP

(57) ABSTRACT

The present information processing apparatus includes a plurality of memory modules that can be controlled in a first mode in which power is supplied, and in a second mode in which power consumption is smaller than in the first mode, specifies a memory module to be accessed based on input address information, shifts the specified memory module from the second mode to the first mode, and, upon access to the specified memory module being terminated, shifts the specified memory module from the first mode to the second mode.

16 Claims, 12 Drawing Sheets

(56) References Cited

U.S. PATENT DOCUMENTS

| | | | |
|---|---|---|---|
| 2014/0078530 A1* | 3/2014 | Lee | G06F 21/608 358/1.13 |
| 2015/0012769 A1* | 1/2015 | Koga | G06F 3/1221 713/323 |
| 2016/0087618 A1* | 3/2016 | Niitsuma | H03K 5/135 365/233.11 |
| 2016/0352952 A1* | 12/2016 | Ito | H04N 1/00965 |

* cited by examiner

FIG. 11

| 168 | 40 | 136 | 8 | 168 | 40 | 136 | 8 | 168 | 40 | 136 | 8 | 168 | 40 | 136 | 8 |
|---|---|---|---|---|---|---|---|---|---|---|---|---|---|---|---|
| 104 | 232 | 72 | 200 | 104 | 232 | 72 | 200 | 104 | 232 | 72 | 200 | 104 | 232 | 72 | 200 |
| 152 | 24 | 184 | 56 | 152 | 24 | 184 | 56 | 152 | 24 | 184 | 56 | 152 | 24 | 184 | 56 |
| 88 | 216 | 120 | 248 | 88 | 216 | 120 | 248 | 88 | 216 | 120 | 248 | 88 | 216 | 120 | 248 |

FIG. 12

APPLY DITHER MATRIX OF COLOR C

| 8 | 136 | 40 | 168 | 8 | 136 | 40 | 168 | 8 | 136 | 40 | 168 | 8 | 136 | 40 | 168 |
|---|---|---|---|---|---|---|---|---|---|---|---|---|---|---|---|
| 200 | 72 | 232 | 104 | 200 | 72 | 232 | 104 | 200 | 72 | 232 | 104 | 200 | 72 | 232 | 104 |
| 56 | 184 | 24 | 152 | 56 | 184 | 24 | 152 | 56 | 184 | 24 | 152 | 56 | 184 | 24 | 152 |
| 248 | 120 | 216 | 88 | 248 | 120 | 216 | 88 | 248 | 120 | 216 | 88 | 248 | 120 | 216 | 88 |
| 168 | 8 | 136 | 40 | 168 | 8 | 136 | 40 | 168 | 8 | 136 | 40 | 168 | 8 | 136 | 40 |
| 104 | 200 | 72 | 232 | 104 | 200 | 72 | 232 | 104 | 200 | 72 | 232 | 104 | 200 | 72 | 232 |
| 152 | 56 | 184 | 24 | 152 | 56 | 184 | 24 | 152 | 56 | 184 | 24 | 152 | 56 | 184 | 24 |
| 88 | 248 | 120 | 216 | 88 | 248 | 120 | 216 | 88 | 248 | 120 | 216 | 88 | 248 | 120 | 216 |
| 40 | 168 | 8 | 136 | 40 | 168 | 8 | 136 | 40 | 168 | 8 | 136 | 40 | 168 | 8 | 136 |
| 232 | 104 | 200 | 72 | 232 | 104 | 200 | 72 | 232 | 104 | 200 | 72 | 232 | 104 | 200 | 72 |
| 24 | 152 | 56 | 184 | 24 | 152 | 56 | 184 | 24 | 152 | 56 | 184 | 24 | 152 | 56 | 184 |
| 216 | 88 | 248 | 120 | 216 | 88 | 248 | 120 | 216 | 88 | 248 | 120 | 216 | 88 | 248 | 120 |

APPLY DITHER MATRIX OF COLOR Y

| 200 | 72 | 232 | 104 | 200 | 72 | 232 | 104 | 200 | 72 | 232 | 104 | 200 | 72 | 232 | 104 |
|---|---|---|---|---|---|---|---|---|---|---|---|---|---|---|---|
| 56 | 184 | 24 | 152 | 56 | 184 | 24 | 152 | 56 | 184 | 24 | 152 | 56 | 184 | 24 | 152 |
| 248 | 120 | 216 | 88 | 248 | 120 | 216 | 88 | 248 | 120 | 216 | 88 | 248 | 120 | 216 | 88 |
| 40 | 168 | 8 | 136 | 40 | 168 | 8 | 136 | 40 | 168 | 8 | 136 | 40 | 168 | 8 | 136 |
| 232 | 104 | 200 | 72 | 232 | 104 | 200 | 72 | 232 | 104 | 200 | 72 | 232 | 104 | 200 | 72 |
| 24 | 152 | 56 | 184 | 24 | 152 | 56 | 184 | 24 | 152 | 56 | 184 | 24 | 152 | 56 | 184 |
| 216 | 88 | 248 | 120 | 216 | 88 | 248 | 120 | 216 | 88 | 248 | 120 | 216 | 88 | 248 | 120 |
| 8 | 136 | 40 | 168 | 8 | 136 | 40 | 168 | 8 | 136 | 40 | 168 | 8 | 136 | 40 | 168 |
| 200 | 72 | 232 | 104 | 200 | 72 | 232 | 104 | 200 | 72 | 232 | 104 | 200 | 72 | 232 | 104 |
| 56 | 184 | 24 | 152 | 56 | 184 | 24 | 152 | 56 | 184 | 24 | 152 | 56 | 184 | 24 | 152 |
| 248 | 120 | 216 | 88 | 248 | 120 | 216 | 88 | 248 | 120 | 216 | 88 | 248 | 120 | 216 | 88 |
| 40 | 168 | 8 | 136 | 40 | 168 | 8 | 136 | 40 | 168 | 8 | 136 | 40 | 168 | 8 | 136 |

INFORMATION PROCESSING APPARATUS AND METHOD FOR CONTROLLING THE SAME

BACKGROUND OF THE INVENTION

Field of the Invention

The present invention relates to an information processing apparatus that uses an SRAM having a low power consumption mode, and a method for controlling the same.

Description of the Related Art

Recently, microfabrication of semiconductor integrated circuits has increasingly advanced, which has made it possible to integrate a logic circuit and an SRAM, which had been separated into a plurality of chips, into a single chip. However, more leakage current tends to flow through the devices with the increasing reduction in the size thereof. Shutdown of the power supply through power supply separation within a chip is available as a technique to reduce power consumption due to leakage current, but data held in a semiconductor memory, such as an SRAM, is lost due to the shutdown of the power supply, and accordingly, the held data needs to be temporarily saved at the time of the shutdown of the power supply. In this case, the data needs to be copied from a memory area in which the data was temporarily saved at the time of restoration from the shutdown of the power supply, and the restoration takes time.

To solve the above problem, Japanese Patent Laid-Open No. 2012-094228 proposes a technique to reduce leakage current in a state of holding data in an SRAM to save power consumption. This technique enables data to be held while saving power by applying a minimum voltage to a memory array unit to allow stored data to be held and interrupting a power supply to circuits that are not necessary to hold the stored data, such as peripheral circuits. In the following description, a state of thus holding the stored data in a memory module with a minimum current will be referred to as a resume-standby mode (RS mode), and states other than the RS mode will be referred to as a normal mode. When the stored data does not need to be held in the memory array unit, a further power-saving state can be achieved by also interrupting a power supply to the memory array unit. Such a state where the power supply to the memory module is interrupted will be referred to as a power supply cutoff mode.

Incidentally, chips mounted in a digital multifunctional machine are provided with various image processing circuits for scanning, printing, and the like. In these image processing circuits, SRAMs are commonly used for storing tables for various image processing coefficients, and also used as line buffers to hold an intermediate image. Japanese Patent Laid-Open No. 2014-201034 describes controlling of dither processing in image formation processing so that use positions of light emitting elements and print elements are not fixed to prevent deterioration over time. In addition, the recent advances of semiconductor technology have made it possible to integrate a plurality of chips, increasing the capacity of SRAMs within the chips. The proportion of the power consumption in the SRAMs to the entire power consumption in a chip that is in operation tends to increase accordingly. For this reason, there is a need for a reduction in the power consumption in the SRAMs to the greatest extent possible, using an SRAM power saving technique, such as an SRAM having the RS mode (which will be referred to as a resume-SRAM).

However, the aforementioned conventional technique has the following problems. For example, regarding the aforementioned conventional technique, only power saving control for an entire SRAM area has been considered. However, in many cases, various kinds of image processing such as scanning and printing are performed on a certain pixel (which will be called a pixel of interest), using image data in a predetermined area with the pixel of interest at the center (e.g. 5×5 pixels including the pixel of interest, two pixels above and below the pixel of interest, and two pixels on the left and right sides of the pixel of interest). In this case, image processing is executed on the pixel of interest by reading out only the image data in the area necessary for image processing (pixel data within the 5×5 window) from the SRAM. That is to say, if power saving control can be performed corresponding to the pixel level in the image processing, power consumption in the SRAM can be considerably reduced.

In other words, at any timing while image processing is executed, power does not need to be supplied in the normal mode to SRAM areas that hold image data other than target image data and any other data. Accordingly, it is desirable to perform control so as to activate, in the normal mode, the SRAM area in which the target pixel data is held only when accessing this area, and hold data in the other SRAM areas in the RS mode.

SUMMARY OF THE INVENTION

The present invention enables realization of a mechanism to selectively and dynamically supply power to an area in a memory module that is predicted to be accessed during image processing, and power supply to an area in the memory module that is not to be accessed is restricted.

One aspect of the present invention provides an information processing apparatus comprising: a plurality of memory modules that can be controlled in a first mode in which power is supplied and in a second mode in which power consumption is smaller than in the first mode; and a controller configured to specify a memory module to be accessed based on input address information, shift the specified memory module from the second mode to the first mode, and, upon access to the specified memory module being terminated, shift the specified memory module from the first mode to the second mode.

Another aspect of the present invention provides a method for controlling an information processing apparatus including a plurality of memory modules that can be controlled in a first mode in which power is supplied and in a second mode in which power consumption is smaller than in the first mode, the method comprising: specifying a memory module to be accessed based on input address information, and shifting the specified memory module from the second mode to the first mode; and shifting, upon access to the specified memory module being terminated, the specified memory module from the first mode to the second mode.

Still another aspect of the present invention provides an information processing apparatus comprising: a plurality of memory modules each having a plurality of areas that can be controlled in a first mode in which power is supplied and in a second mode in which power consumption is smaller than in the first mode; and a controller configured to specify an area to be accessed based on input address information, shift the specified area from the second mode to the first mode, and, upon access to the specified area being terminated, shift the specified area from the first mode to the second mode.

Yet still another aspect of the present invention provides a method for controlling an information processing apparatus including a plurality of memory modules each having a plurality of areas that can be controlled in a first mode in which power is supplied and in a second mode in which power consumption is smaller than in the first mode, the method comprising: specifying an area to be accessed based on input address information; shifting the specified area from the second mode to the first mode; and, shifting, upon access to the specified area being terminated, the specified area from the first mode to the second mode.

Further features of the present invention will be apparent from the following description of exemplary embodiments with reference to the attached drawings.

BRIEF DESCRIPTION OF THE DRAWINGS

FIG. 11 shows an example of access to a dither threshold matrix in a main scanning direction according to an embodiment.

FIG. 12 shows an example of access to the dither threshold matrix during color halftone processing according to an embodiment.

DESCRIPTION OF THE EMBODIMENTS

Figure 1:
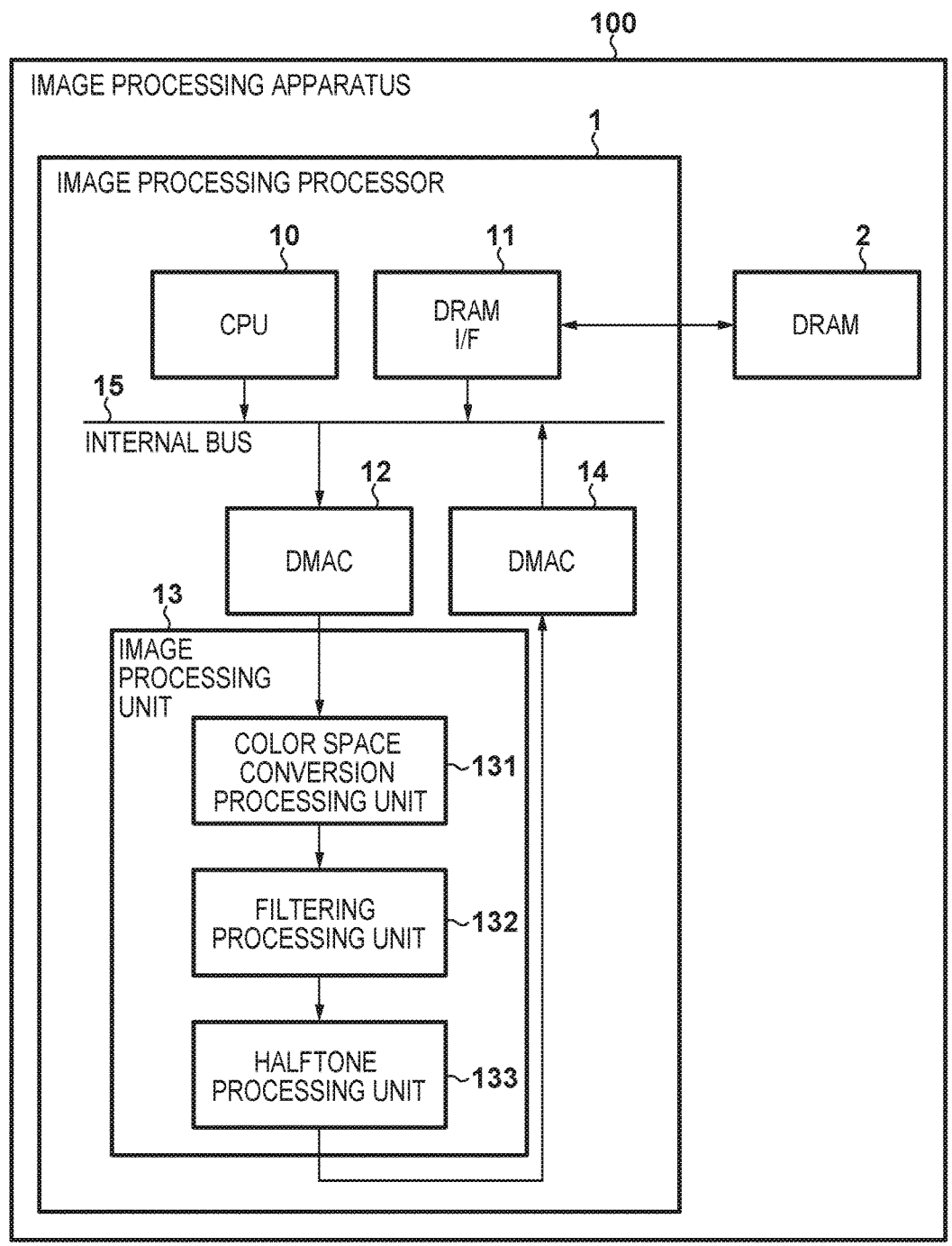
FIG. 1 is a system configuration diagram according to an embodiment.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.
First Embodiment
Configuration of Image Processing Apparatus The first embodiment of the present invention will be described below. First, a description will be given with reference to FIG. 1, while taking, as an example, a laser printer having a print function as an image processing apparatus (information processing apparatus) 100 according to this embodiment. The image processing apparatus 100 includes an image processing processor 1 and a DRAM 2. The image processing processor 1 is an ASIC (Application Specific Integrated Circuit) that processes the print function of the laser printer. The image processing processor 1 includes a CPU 10, a DRAM I/F 11, a DMAC 12, an image processing unit 13, a DMAC 14, and an internal bus 15 that connects these elements.

The CPU 10 comprehensively controls processing related to the print function in accordance with an OS and a control program that have been loaded into the DRAM 2. The DRAM I/F 11 is a memory interface that connects the DRAM 2, which is provided outside the image processing processor 1, to the internal bus 15. The DMAC 12 is a DMA transfer controller (hereinafter abbreviated as a DMAC) to supply input image data to the image processing unit 13, which includes a color space conversion processing unit 131, a filtering processing unit 132, and a halftone processing unit 133. The DMAC 14 is a DMAC to write back output image data of the image processing unit 13 to the DRAM 2. The internal bus 15 is a bus to connect the CPU 10, the DRAM I/F 11, the DMACs 12 and 14, and the image processing unit 13 to one another.

In the image processing unit 13, at least the following image processing is executed. The color space conversion processing unit 131 performs one kind of image processing that constitutes the image processing unit 13. The filtering processing unit 132 also performs one kind of image processing that constitutes the image processing unit 13. The halftone processing unit 133 also performs one kind of image processing that constitutes the image processing unit 13. In the image processing unit 13, print image processing is sequentially performed on image data for one page, for example. It is assumed here that image processing for one page is performed by performing image processing for one line (n pixels) in the main scanning direction and repeating it for m lines in a sub-scanning direction. Accordingly, image data for one line is sequentially transferred within the image processing unit 13.

Detailed Configuration of Image Processing Unit

Figure 2:
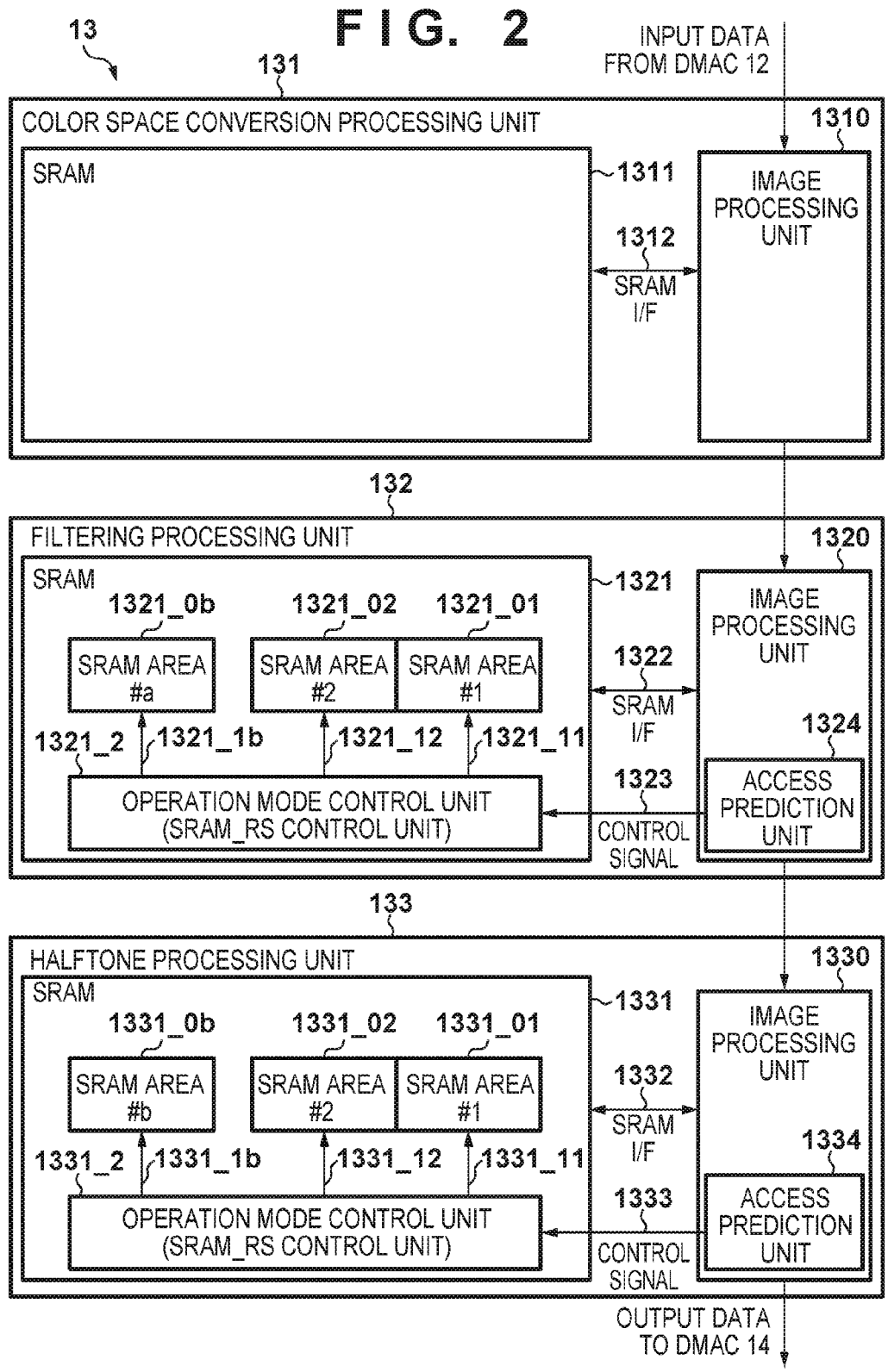
FIG. 2 is a detailed configuration diagram of an image processing unit according to an embodiment.

Next, a detailed configuration of the image processing unit 13 according to this embodiment will be described with reference to FIG. 2. The color space conversion processing unit 131 includes an image processing unit 1310 and an SRAM (memory module) 1311, and these units can exchange data via an SRAM I/F 1312. In the color space conversion processing unit 131, the image processing unit 1310 executes color conversion processing, which is known technique, on input 8-bit RGB image data to convert it into 8-bit CMYK image data. The image processing unit 1310 references a look-up table, which is stored in the SRAM 1311 and defines coefficients for color space conversion, via the SRAM I/F 1312 when performing color space conversion processing. It is here assumed that the power saving control proposed here is not performed in image processing performed by the color space conversion processing unit 131, since access to the SRAM is random depending on the pixel value, and is accordingly difficult to predict.

Next, the filtering processing unit 132 includes an image processing unit 1320 and SRAMs 1321, and these units can exchange data via SRAMs I/F 1322. The filtering processing unit 132 executes filtering processing for the purpose of edge enhancement, which is a known technique, on the 8-bit CMYK image data input from the color space conversion processing unit 131, and outputs the processing result. At this time, to perform filtering processing, image data needs to be referenced from a plurality of (e.g. five) pixels in the main scanning direction and also from a plurality of (e.g. five) lines in the sub-scanning direction, e.g. from 5×5 pixels. For this reason, the image processing unit 1320 uses the SRAM 1321 as line buffers to sequentially reference the image data via the SRAM I/Fs 1322 during filtering processing. Here, the filtering processing unit 132 can predict access to the line buffer in a one dimensional direction, which is the main scanning direction, and therefore, power saving control according to this embodiment can be applied.

The image processing unit 1320 in the filtering processing unit 132 includes an access prediction unit 1324, which outputs a control signal 1323. The SRAMs 1321 each include SRAM areas #1 (1321_01) to #a (1321_0*a*), which are obtained by dividing the address area into a, and also include an operation mode control unit 1321_2, which controls the power state in the respective SRAM areas. The operation mode control unit is also called an SRAM_RS control unit. The SRAM_RS control unit 1321_2 controls the power state in the SRAM areas 1321_01 to 1321_0*a* using RS signals 1321_10 to 1321_1*a*. That is to say, the SRAM according to this embodiment has a configuration in which the power mode in the respective SRAM areas can be controlled in a normal mode (first mode) and a resume-standby mode (second mode), which is a power-saving mode.

Next, the halftone processing unit 133 includes an image processing unit 1330 and SRAMs 1331, and these units can exchange data via SRAMs I/F 1332. The halftone processing unit 133 performs halftone processing using dithering, which is a known technique, on an input multi-valued image signal, and performs processing to convert it into an image signal whose density can be expressed based on the area. Dither threshold matrix coefficients for this halftone processing are stored in the SRAMs 1331, and are referenced via the SRAM I/Fs 1332 during halftone processing. Image data that has been subjected to halftone processing is written back to the DRAM 2 via the DMAC14.

Here, power saving control proposed here according to the later-described second embodiment can be applied to the halftone processing unit 133, since access to the dither threshold matrix can be predicted in two-dimensional directions, based on a main scanning position and a sub-scanning position on an image. The image processing unit 1330 in the halftone processing unit 133 includes an access prediction unit 1334, which outputs a control signal 1333. The SRAM 1331 includes SRAM areas #1 (1331_01) to #b (1331_0*b*), which are obtained by dividing the address area into b, and includes an SRAM_RS control unit 1331_2, which controls the power state in the respective SRAM areas.

In the following description, this embodiment will describe power saving processing for the SRAM in the filtering processing unit 132, and the second embodiment will describe power saving processing for the SRAM in the halftone processing unit 133.

Details of Line Buffer Control SRAM Unit

Next, a description will be given, with reference to FIG. 3, of a configuration example of the filtering processing unit 132 according to this embodiment, extracting features involving line buffer control and n×n window control.

The filtering processing unit 132 includes the image processing unit 1320 and four SRAMs 1321_1 to 1321_4. The image processing unit 1320 and the four SRAMs are connected to each other via SRAM I/Fs 1322_1 to 1322_4 and control signals 1323_1 to 1323_4. It is assumed here that the SRAMs 1321_1 to 1321_4 are line buffers each having a bit width of 8 bits×four colors (CMYK) and a word number for one line in the main scanning direction (here, 1 line=6400 pixels). The SRAMs 1321_1 to 1321_4 each includes SRAM areas (SRAM area #1 to SRAM area #a), which are obtained by dividing addresses into a (a=50) in the main scanning direction. That is to say, addresses 0 to 127 are set as the SRAM area #1, addresses 128 to 255 are set as the SRAM area #2, and the following addresses are set as an SRAM area #a in units of 128 words, which is equal to the result of dividing 6400 words by 50.

Figure 3:
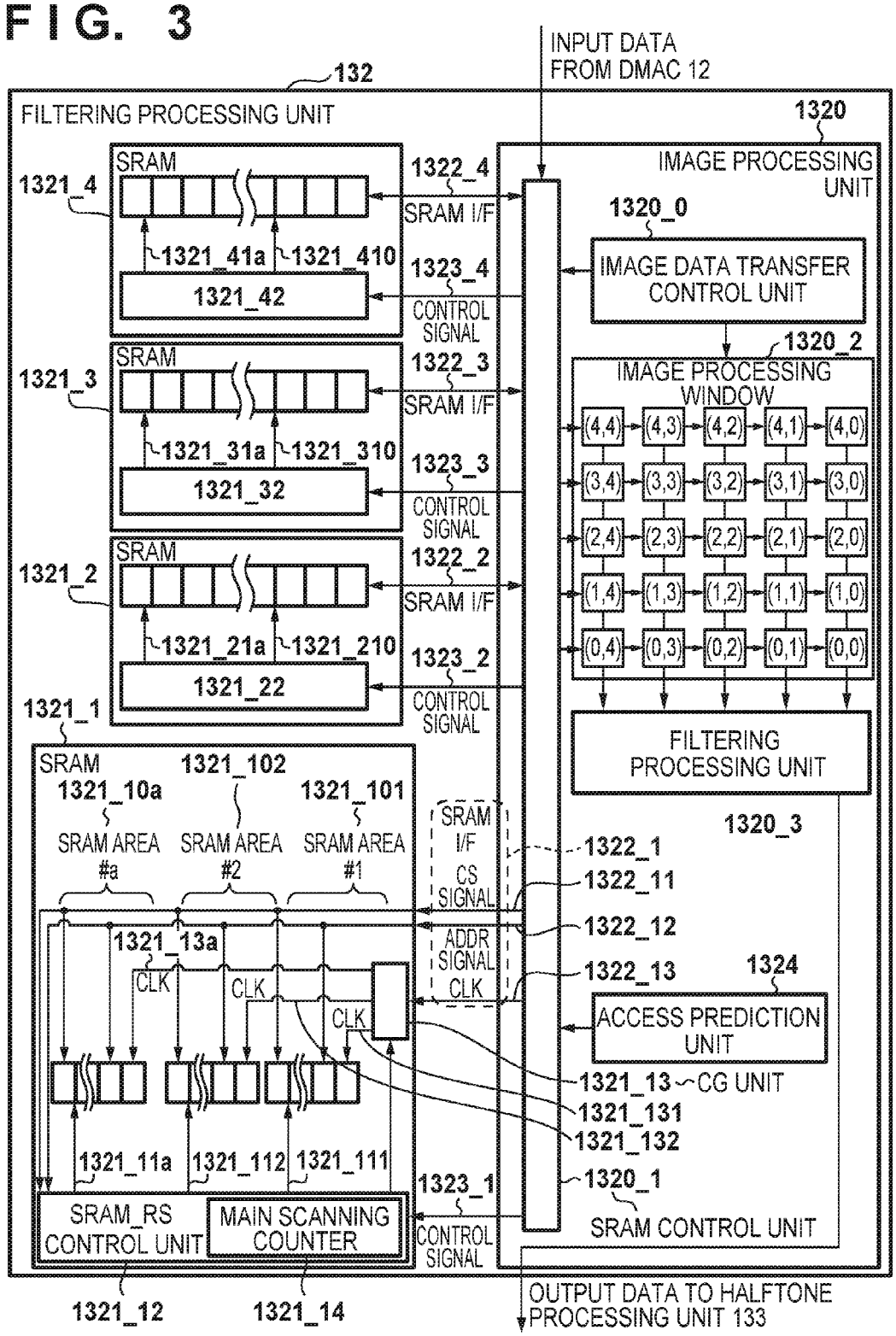
FIG. 3 is a detailed configuration diagram of a filtering processing unit 132 according to an embodiment.

FIG. 3 only shows the SRAM 1321_1 in detail, since the SRAMs 1321_1 to 1321_4 have the same configuration. The SRAM 1321_1 is internally divided by a (a=50) into the SRAM areas #1 (1321_101) to #a (1321_10*a*). The SRAM_RS control unit 1321_12 performs power saving control for the individual SRAM areas in the SRAM 1321_1 using RS signals 1321_110 to 1321_11*a*. Also, the SRAM_RS control unit 1321_12 simultaneously performs, through a CG unit 1321_13, power saving control by means of clock-gating on each of the SRAM areas #1 to #a. The CG unit 1321_13 supplies a CLK 1321_131 to a CLK1321_13*a* to the respective SRAM areas #1 to #a.

The SRAM areas #1 to #a are accessed by the SRAM control unit 1320_1 via one SRAM I/F 1322_1. The SRAM I/F 1322_1 is a general interface signal line for access to the SRAM. However, FIG. 3 only shows chip-select (CS signal 1322_11), address (ADDR signal 1322_12), and clock (CLK1322_13), which are signals associated with SRAM power saving control according to the present invention. The SRAM_RS control unit 1321_12 includes a main scanning counter 1321_14, which is controlled by an image data transfer control unit 1320_0 via an SRAM control unit 1320_1 and a control signal 1323_1. The main scanning counter 1321_14 is for adjusting the timing of processing image data in the main scanning direction thereof. More specifically, the main scanning counter 1321_14 is for adjusting the timing of accessing the respective addresses in the SRAM.

To reference 5×5 pixels to perform filtering processing, the image processing unit 1320 needs to simultaneously reference five pixels in the main scanning direction and five pixels in the sub-scanning direction, and includes an image processing window 1320_2 to temporarily hold the pixel data in these pixels. The image processing window 1320_2 holds image data in five rows×five columns, e.g. (0, 0) to (4, 4) in (row, column) coordinates. It is assumed here that the main scanning direction corresponds to the column, and the sub-scanning direction corresponds to the row.

The image processing unit 1320 has the image data transfer control unit 1320_0, which governs image data transfer, such as input image data from the DMAC 12, image data transfer to the SRAM control unit 1320_1, and image data transfer to the image processing window 1320_2. The image processing unit 1320 also includes a filtering processing unit 1320_3, which references the image processing window 1320_2. The filtering processing unit 1320_3 also controls output data to the halftone processing unit 133 at the next stage.

It is assumed that the input image data required for image processing performed in the image processing unit 1320 is sent for one pixel (8 bits×four, i.e. CMYK colors) in every one cycle from the color space conversion processing unit 131 at the previous stage in the image processing unit, through an interface such as a FIFO, for example. The image data transfer control unit 1320_0 controls data transfer, e.g. requests this input image data from the FIFO of the image processing unit at the previous stage, transfers it to the SRAM 1321_3, and transfers it to (4, 4) in the image processing window 1320_2.

Figure 4:
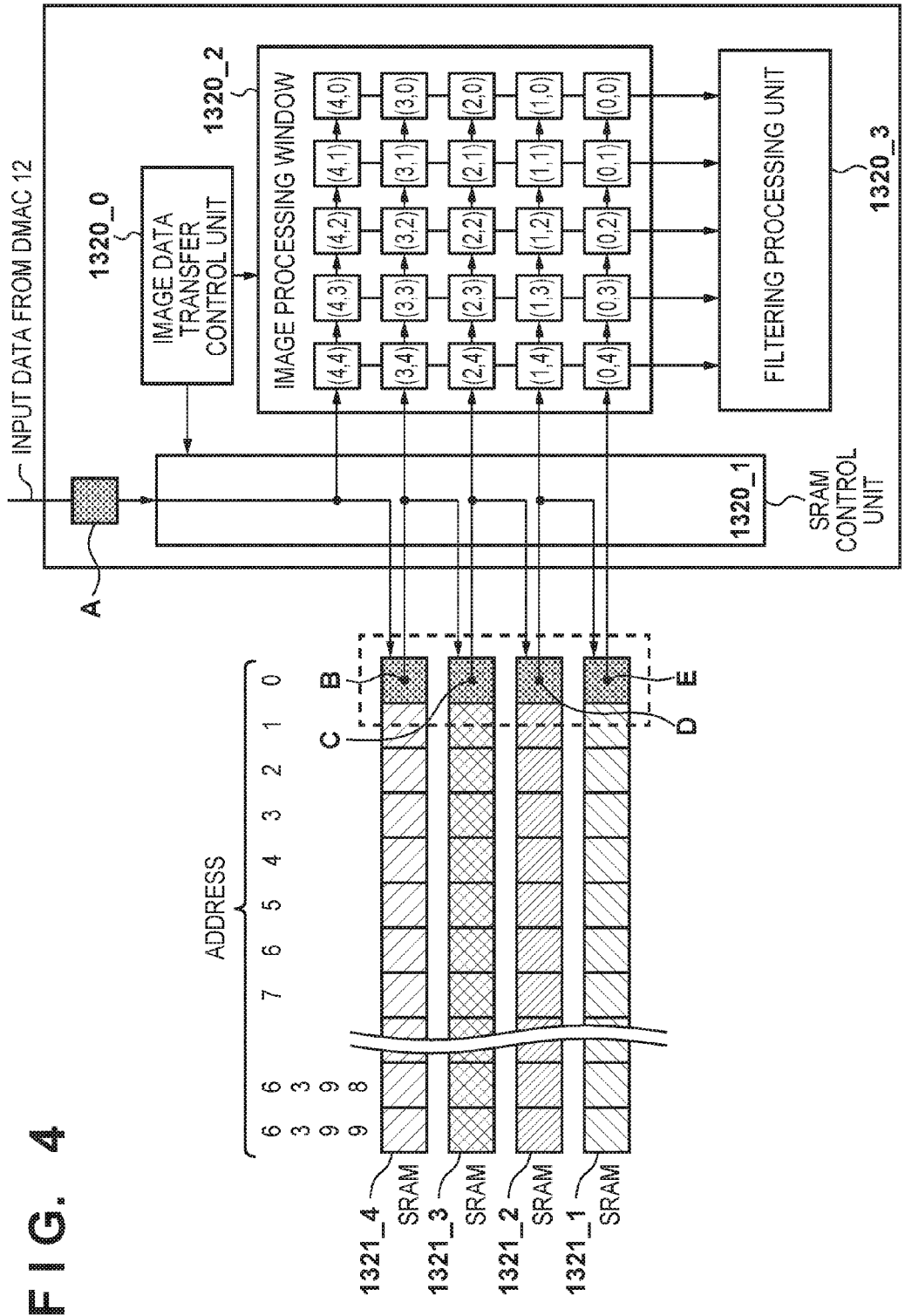
FIG. 4 is a detailed diagram of data transfer control in a first cycle after data has been accumulated in line buffers according to an embodiment.
Figure 5:
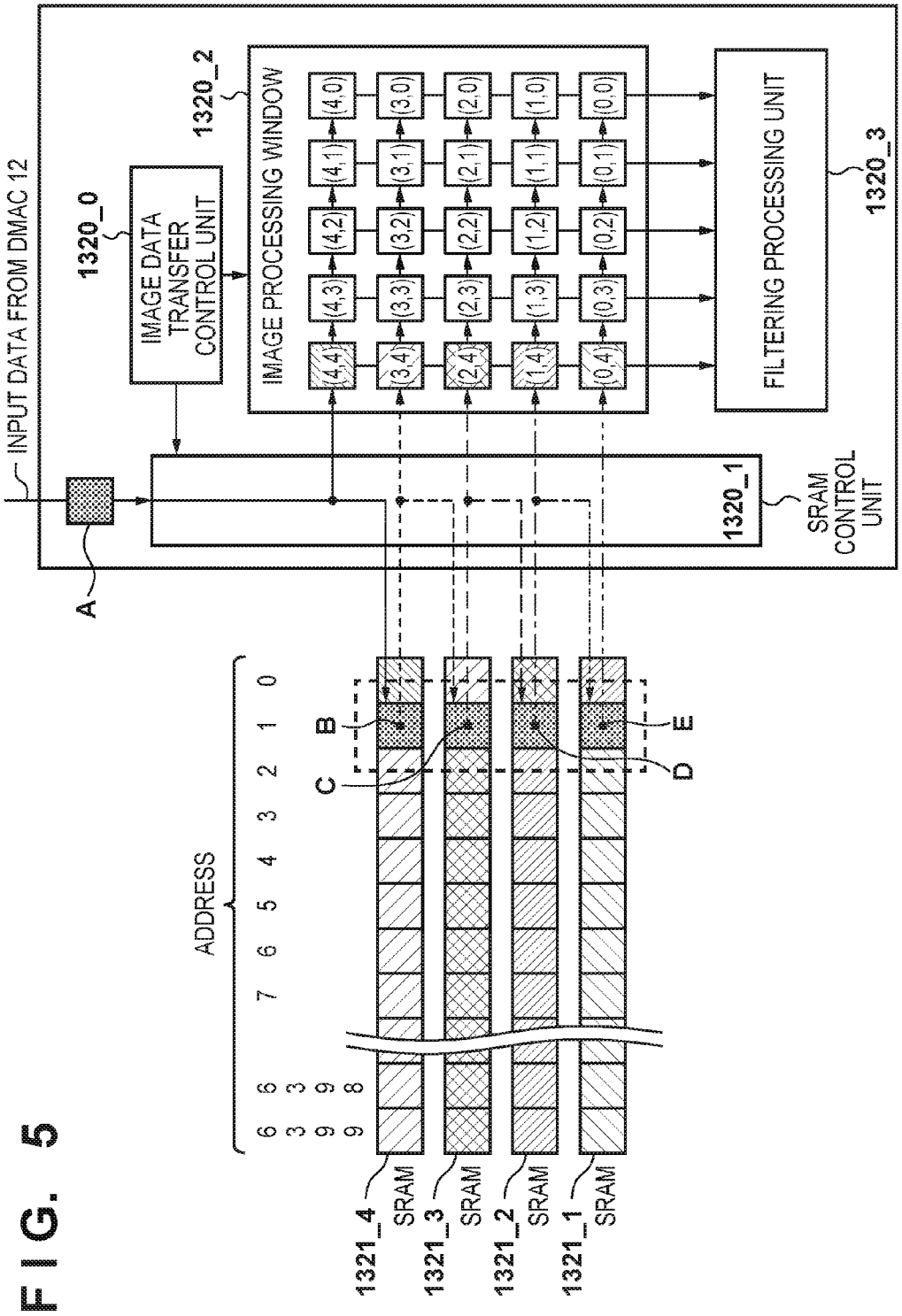
FIG. 5 is a detailed diagram of data transfer control in a second cycle after data has been accumulated in the line buffers according to an embodiment.

A description will now be given, with reference to FIGS. 3 to 5, of image data transfer control by the filtering processing unit using the n×n pixel window and the line buffers. Since the line buffers initially are in an empty state, the image data transfer control unit 1320_0 reads out the input image data from the FIFO at the previous stage, and stores the read image data in the line buffers (step_A1 to step_A25600).

Specifically, in step_A1, the image data transfer control unit 1320_0 controls the SRAM control unit 1320_1 so as to store the initial input image data on one page in the address 0 in the SRAM 1321_1. Subsequently, in step_A2, the image data transfer control unit 1320_0 performs control so as to store sent input image data in the address 1 in the SRAM 1321_1. Thereafter, in step_A3 to step_A6399, the image data transfer control unit 1320_0 sequentially stores sequentially sent input image data in this manner. Thus, image data for one line (=6400 pixels) on the first line is stored in the SRAM 1321_1, which is a line buffer on the first line.

Next, in step_A6400 to step_A12799, the image data transfer control unit 1320_0 stores image data on a second line in the SRAM 1321_2. Similarly, in step_A12800 to step_A19199, the image data transfer control unit 1320_0 stores image data on a third line in the SRAM 1321_3. Similarly, in step_A19200 to step_A25599, the image data transfer control unit 1320_0 stores image data on a fourth line in the SRAM 1321_4. Thereafter, in step_A25600, the image data transfer control unit 1320_0 has stored the image data in the line buffers for four lines until this point, and accordingly switches the image data transfer control method.

To simplify the description, the following description will be given while assuming the next cycle as step_B1. Image data transfer control in step_B1 onward will now be described using FIG. 4. In step_B1, the image data transfer control unit 1320_0 performs the following control simultaneously.

Specifically, in step_B1, image data A in a first pixel on a fifth line is input from the DMAC 12. The image data transfer control unit 1320_0 controls the SRAM control unit 1320_1 so as to store this data in (4, 4) in the image processing window 1320_2 and the address 0 in the SRAM 1321_4, which is the line buffer on the fourth line. The image data transfer control unit 1320_0 also reads out data B stored in the address 0 in the SRAM 1321_4. The image data transfer control unit 1320_0 also controls the SRAM control unit 1320_1 so as to store this data B in (3, 4) in the image processing window 1320_2 and the address 0 in the SRAM 1321_3, which is the line buffer on the third line. The image data transfer control unit 1320_0 also reads out data C stored in the address 0 in the SRAM 1321_3. The image data transfer control unit 1320_0 also controls the SRAM control unit 1320_1 so as to store this data C in (2, 4) in the image processing window 1320_2 and the address 0 in the SRAM 1321_2, which is the line buffer on the second line. The image data transfer control unit 1320_0 also reads out data D stored in the address 0 in the SRAM 1321_2. The image data transfer control unit 1320_0 also controls the SRAM control unit 1320_1 so as to store this data D in (1, 4) in the image processing window 1320_2 and the address 0 in the SRAM 1321_1, which is the line buffer on the first line. The image data transfer control unit 1320_0 also reads out data E stored in the address 0 in the SRAM 1321_1. The image data transfer control unit 1320_0 also controls the SRAM control unit 1320_1 so as to store this data E in (0, 4) in the image processing window 1320_2. As a result, the data that has been read out from the address 0 in all line buffers is transferred to the left end of the image processing window and the address 0 in the line buffer on the subsequent line.

Subsequently, image data transfer control in step_B2 onward will be described with reference to FIG. 5. In step_B2, the image data transfer control unit 1320_0 changes the address in the SRAM 1321_1 to SRAM 1321_4 to 1, and performs the same line buffer transfer control as in step_B1 on the respective SRAMs. The transfer destination in the image processing window is the left end of the same image processing window as in step_B1. Here, in step_B2, the following data transfer control is performed simultaneously on the image processing window.

Specifically, in step_B2, the image data transfer control unit 1320_0 performs control so that the data at (4, 4) is automatically transferred in the row direction to (4, 3). Simultaneously, the image data transfer control unit 1320_0 forwards data in the row direction so as to transfer data at (4, 3), (4, 2), and (4, 1) to (4, 2), (4, 1), and (4, 0), respectively. The image data transfer control unit 1320_0 also performs controls so that the data at (3, 4) is automatically transferred in the row direction to (3, 3). Similarly, the image data transfer control unit 1320_0 forwards data in the row direction so as to transfer data at (3, 3), (3, 2), and (3, 1) to (3, 2), (3, 1), and (3, 0), respectively. The image data transfer control unit 1320_0 also performs controls so that the data at (0, 4) is automatically transferred in the row direction to (0, 3). Similarly, the image data transfer control unit 1320_0 forwards data in the row direction so as to transfer data at (0, 3), (0, 2), and (0, 1) to (0, 2), (0, 1), and (0, 0), respectively. Through this control, the data in the image processing window 1320_2 is subjected to transfer control so as to be forwarded in the row direction.

As described above, the input image data is transferred in order into the line buffers and the image processing window by combining forward transfer control through reading from and writing to the line buffers with forward transfer control in the row direction of the image processing window.

Figure 6:
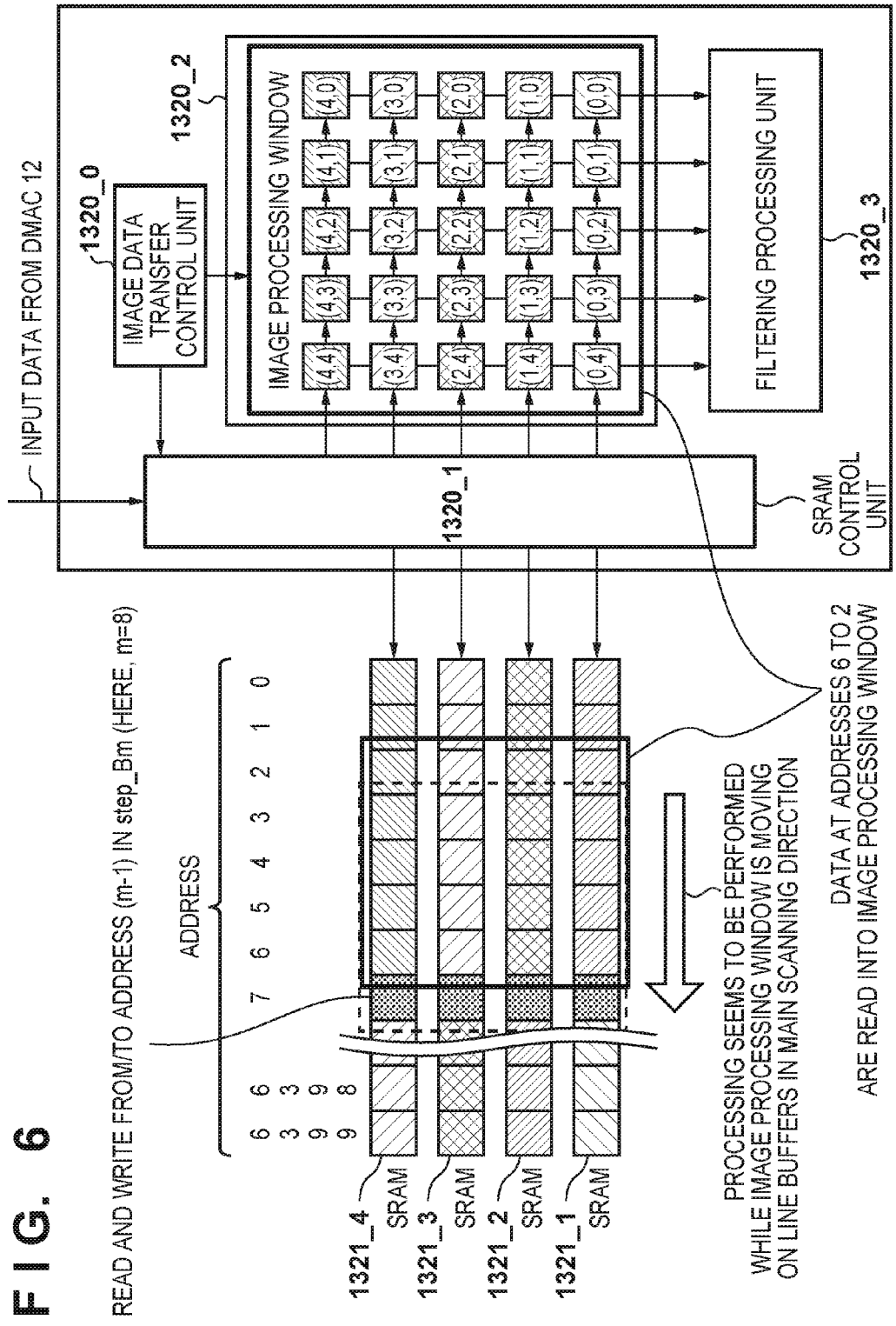
FIG. 6 is a diagram illustrating a correlation between data that has been loaded in an image processing window and addresses in the line buffers according to an embodiment.

FIG. 6 shows the state in the cycle in step_Bm (m=8). Values read out from the address m-2 to address m-6 (i.e., address 6 to address 2) in the respective line buffers are just stored as data in the image processing window 1320_2 that is in operation (indicated by a thick-line frame in FIG. 6). Furthermore, in the next cycle, i.e. in the cycle in step_B9, the values read out from the address 7 to address 3 are stored, as if this window has moved leftward as indicated by a broken-line frame in FIG. 6. That is to say, as shown in FIG. 6, control can be performed as if the values held in the line buffers are image-processed in the image processing window 1320_2 as if those values are moving in the main scanning direction in every cycle.

The image data transfer control by the filtering processing unit using the n×n pixel window and the line buffers have been described above. Now, an SRAM power saving control method characteristic to the present invention will be described. As described above, the data transfer control for image processing is performed using the combination of the n×n pixel window and the line buffers. A characteristic point of this data transfer control lies in that the address in the SRAM in each line buffer to/from which data is written and read is only one word in 6400 words in the main scanning direction. That is to say, in FIGS. 4 to 6, the address to/from which data is written and read is only one address in each SRAM.

In the data transfer control according to an image processing algorithm for filtering processing, only one word needs to be accessed in a certain cycle, and access advances in a one-dimensional direction so that the address is incremented sequentially in the main scanning direction. Accordingly, this algorithm is data transfer control that enables prediction of access to the SRAM. In view of this point, according to the present invention, the resume-standby mode (RS mode; second mode) mentioned in the description of the related art is applied to memory array units that are irrelevant to addresses that need to be accessed. Meanwhile, power saving control for the SRAMs is performed so as to apply the normal mode (first mode) to the addresses that need to be accessed.

Although an overhead (time) occurs to resume from the RS mode to the normal mode, access timing can be readily predicted in the aforementioned access with which the address is incremented sequentially in the main scanning direction. Accordingly, power saving control is performed so as to resume areas of the SRAM that include the addresses to be accessed from the RS mode to the normal mode at the necessary timing of access.

According to the present invention, power saving control is performed to the greatest extent possible based on prediction control for image processing data transfer. Accordingly, it is assumed that this image processing apparatus performs control so as to operate all SRAM areas in the SRAM 1321_1 to SRAM 1321_4 basically in the RS mode, and performs control in the normal mode only in a period in which access is predicted to be performed. For example, a configuration may also be employed in which an area that is currently being accessed, as well as an area that is predicted to be accessed next are controlled in the normal mode, and an area that has finished being accessed is controlled to the RS mode.

Timing Chart

Figure 7:
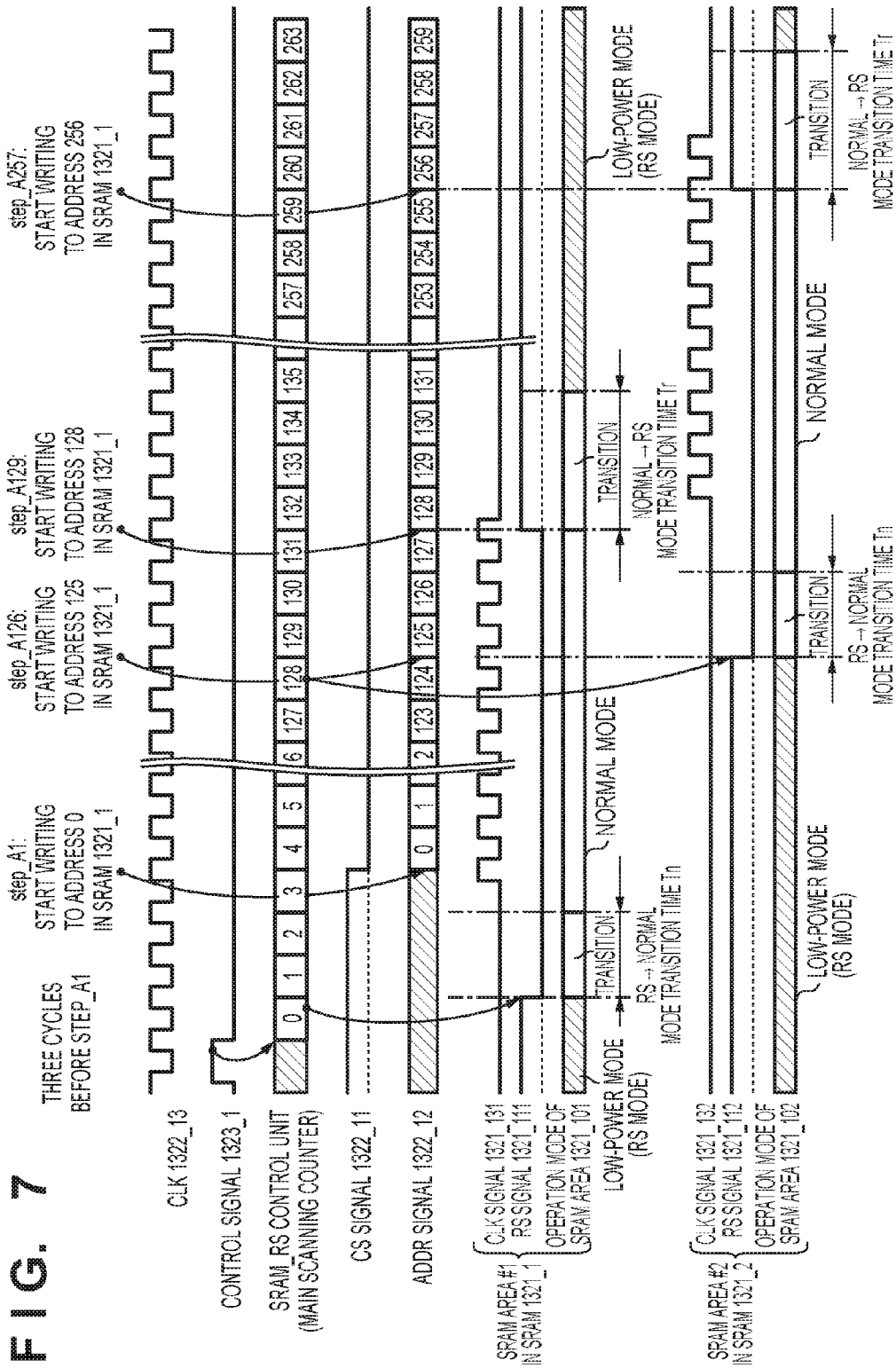
FIG. 7 is a timing chart illustrating operations in power saving control on SRAMs when data is accumulated in the line buffers according to an embodiment.

Next, a description will be given, with reference to FIG. 7, of control timing in the RS mode (second mode) and the normal mode (first mode) in a resume-SRAM 1321_1 around the aforementioned step_A1 to step_A256 at the time of storing data in empty line buffers. In FIG. 7, the image data transfer control unit 1320_0 reads out data from the FIFO at the previous stage, and resumes the SRAM area #1 (1321_101) to the normal mode in advance three cycles before step_A1 starts. That is to say, at a predetermined number of counts before a specific count given by the main scanning counter at which a predetermined area is predicted to be accessed, the image data transfer control unit 1320_0 controls the predetermined area from the RS mode to the normal mode. Specifically, the image data transfer control unit 1320_0 performs control so as to set an RS signal 1321_111 to L via a control signal 1323_1.

Then, after a lapse of a mode transition time Tn (it is here assumed that Tn=2 cycles) of the SRAM area #1 (1321_101), the CG unit 1321_13 resumes the supply of a CLK signal 1321_131. Furthermore, the CG unit 1321_13 controls the SRAM control unit 1320_1 so as to output an ADDR signal indicating the address 0 two cycles later, i.e. in step_A1. Thereafter, the CG unit 1321_13 controls the SRAM control unit 1320_1 so as to increment the address indicated by the ADDR signal by one every one cycle.

In step_A126, the image data transfer control unit 1320_0 sets an RS signal 1321_112 to L so as to set the SRAM area #2 (1321_102) to the normal mode. This is triggered by the main scanning counter 1321_14, which counts the access to the SRAM area from 0 to 127, returning to 0.

Next, in step_A129 onward, the image data transfer control unit 1320_0 does not access the SRAM area 1321_101, and accordingly sets the RS signal to H to cause the SRAM area 1321_101 to transition to the power-saving state. Also, the image data transfer control unit 1320_0 simultaneously stops the supply of the CLK signal 1321_131 (clock gating).

In this manner, data can be correctly stored via the SRAM IF 1322_1 while causing the SRAM area #1 (1321_101) to transition to the RS mode, normal mode, and then RS mode in this order. In addition, the same control as that performed on the SRAM area #1 (1321_101) in step_A1 to step_A129 is performed on the SRAM area #2 (1321_102) in step_A129 onward. Thus, data can be correctly stored while causing the SRAM area #2 (1321_102) to transition to the RS mode, normal mode, and then RS mode in this order. That is to say, the SRAM area that is being processed can be favorably caused to transition to the normal mode, and a further improved power saving effect can be achieved. By also performing the same control to the other SRAM areas, image data for four lines can be accumulated in the SRAM 1321, which are line buffers.

Figure 8:
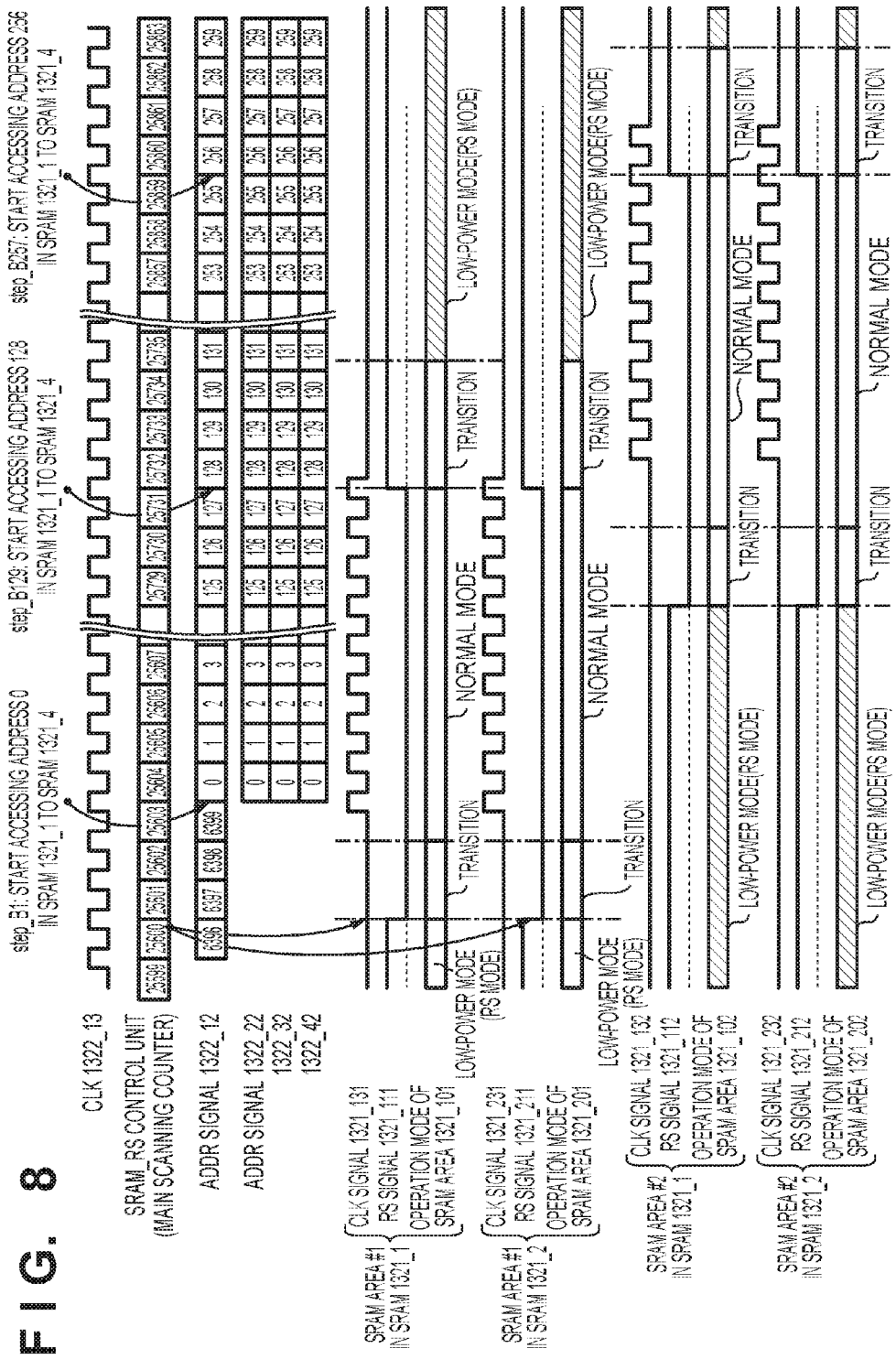
FIG. 8 is a timing chart illustrating power saving control on SRAMs when image processing is executed using the image processing window after data has been accumulated in the line buffers according to an embodiment.

Subsequently, a description will be given, with reference to FIG. 8, of control timing in the RS mode and normal mode in the resume-SRAMs 1321_1 to 1321_4 at the time of executing image processing using the image processing window after data has been accumulated in the line buffers. This timing chart shows operation control for the resume-SRAMs 1321_1 to 1321_4 in step_A25597 (three cycles before step_B1) to step_B1 to step_B260.

Similar to the case in FIG. 7, the respective signals are controlled in accordance with the main scanning counter. A difference from FIG. 7 lies in that, since four SRAMs are simultaneously operated as line buffers on four lines, the ADDR signals 1322_12, 1322_22, 1322_32, and 1322_42 indicate the same address. In addition, a difference also lies in that the four SRAM areas #1 to #a are also subjected to power saving control while transitioning to the RS mode, normal mode, and then to RS mode in this order in the same manner.

As described above, in the case of combining this embodiment with the window image processing to access the line buffers in the main scanning direction, the address to be accessed is predicted through the window image processing. Furthermore, power saving control for each area in one SRAM is performed so that only an area related to the predicted area is set to the normal mode, and the other areas are set to the RS mode. Specifically, this image processing apparatus includes a plurality of memory modules in which each area can be controlled in a normal mode in which power is supplied and in an RS mode in which power consumption is smaller than in the normal mode. The image processing apparatus sequentially predicts an area to be accessed in the memory modules based on an image processing algorithm to be executed, and controls the entire area of the plurality of memory modules in the RS mode. Thereafter, the image processing apparatus sequentially controls the area predicted to be accessed to the normal mode, and after the access to this area has terminated, the image processing apparatus controls this area to the RS mode.

This embodiment has described an example in which 6400 words in the main scanning direction are divided by 50 (a=50) into 128-word areas. Accordingly, only a 1/50 area of each line buffer can be operated in the normal mode, and the remaining 49/50 area can be operated in the RS mode. Usually, power consumption in the RS mode is about 40% of that in the normal mode, and moreover, the capacity of SRAMs to be mounted for image processing in an image forming apparatus is increasing due to a recent increase in image quality. As a result, the power saving control for the resume-SRAMs according to this embodiment can significantly reduce the proportion of power consumption of the SRAMs to that of the entire system. In addition, according to this embodiment, the size of the area to be caused to transition to the normal mode is small, and accordingly, occurrence of a rush current can be suppressed.

Note that, although this embodiment has described a printer as an example of a device, the same power saving control for resume-SRAMs is also applicable to a scanner having an image processing module that similarly uses line buffers. As described above, according to this embodiment, control to activate a resume-SRAM to the normal mode and control to cause the resume-SRAM to transition to the RS mode are performed based on data access according to an image processing algorithm of a device such as a scanner or a printer. Thus, it is possible to reduce power consumption of an SRAM that is synchronized with and operates with an image processing circuit.

Second Embodiment

Details of SRAM Unit for Halftone Processing

Figure 9:
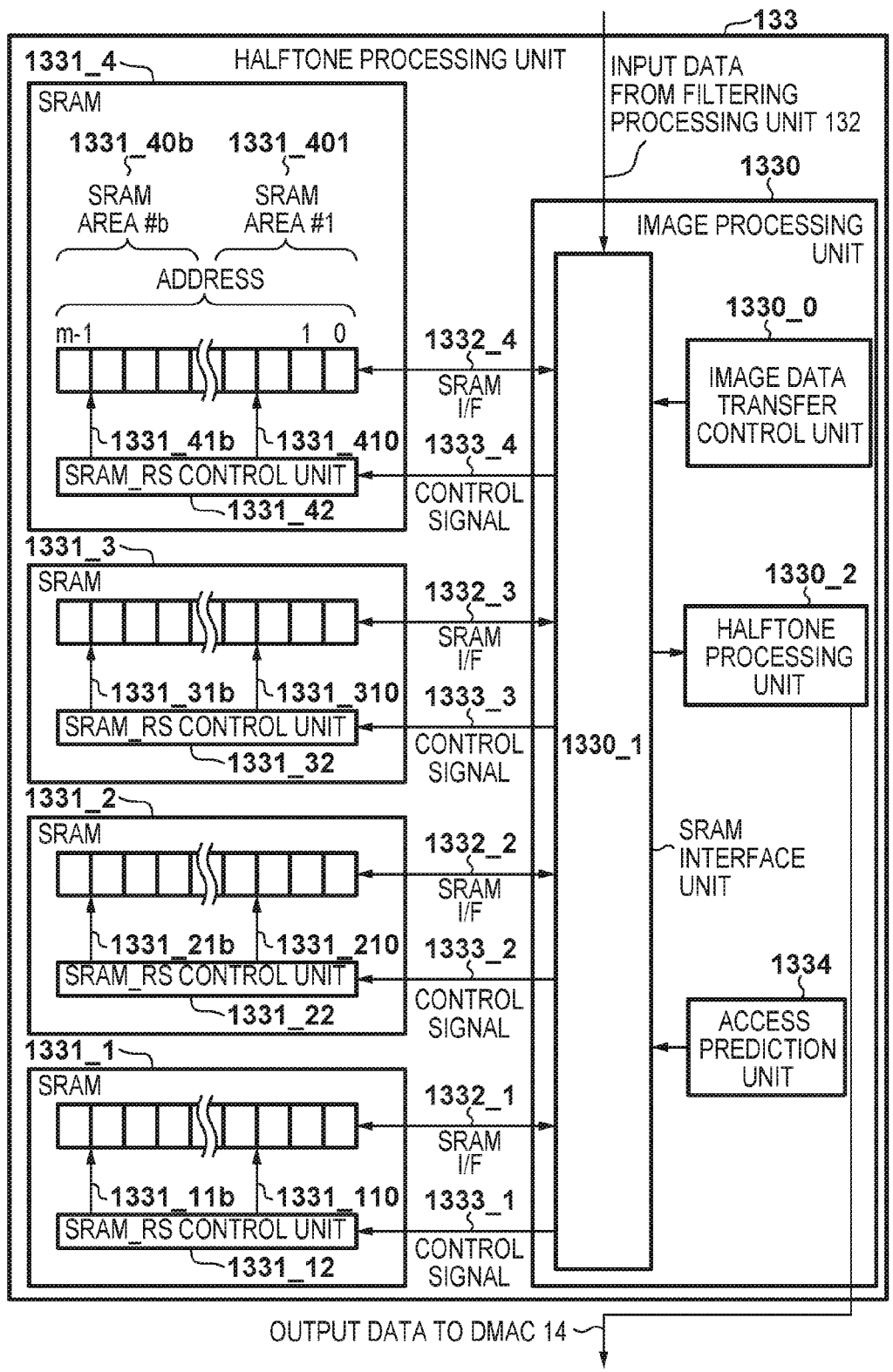
FIG. 9 is a detailed configuration diagram of a halftone processing unit 133 according to an embodiment.

The second embodiment of the present invention will be described below. FIG. 9 shows a configuration example of the halftone processing unit 133, extracting features involving halftone processing.

The halftone processing unit 133 is configured to include an image processing unit 1330 and dither threshold matrix SRAMs 1331_1 to 1331_4 for the respective CMYK colors. The image processing unit 1330 and the four SRAMs are connected to each other via SRAM I/Fs 1332_1 to 1332_4 and control signals 1333_1 to 1333_4. Here, the SRAMs 1331_1 to 1331_4 are for storing an 8-bit dither threshold matrix of 32×32 pixels (=1024 entries), for example.

Figure 10:
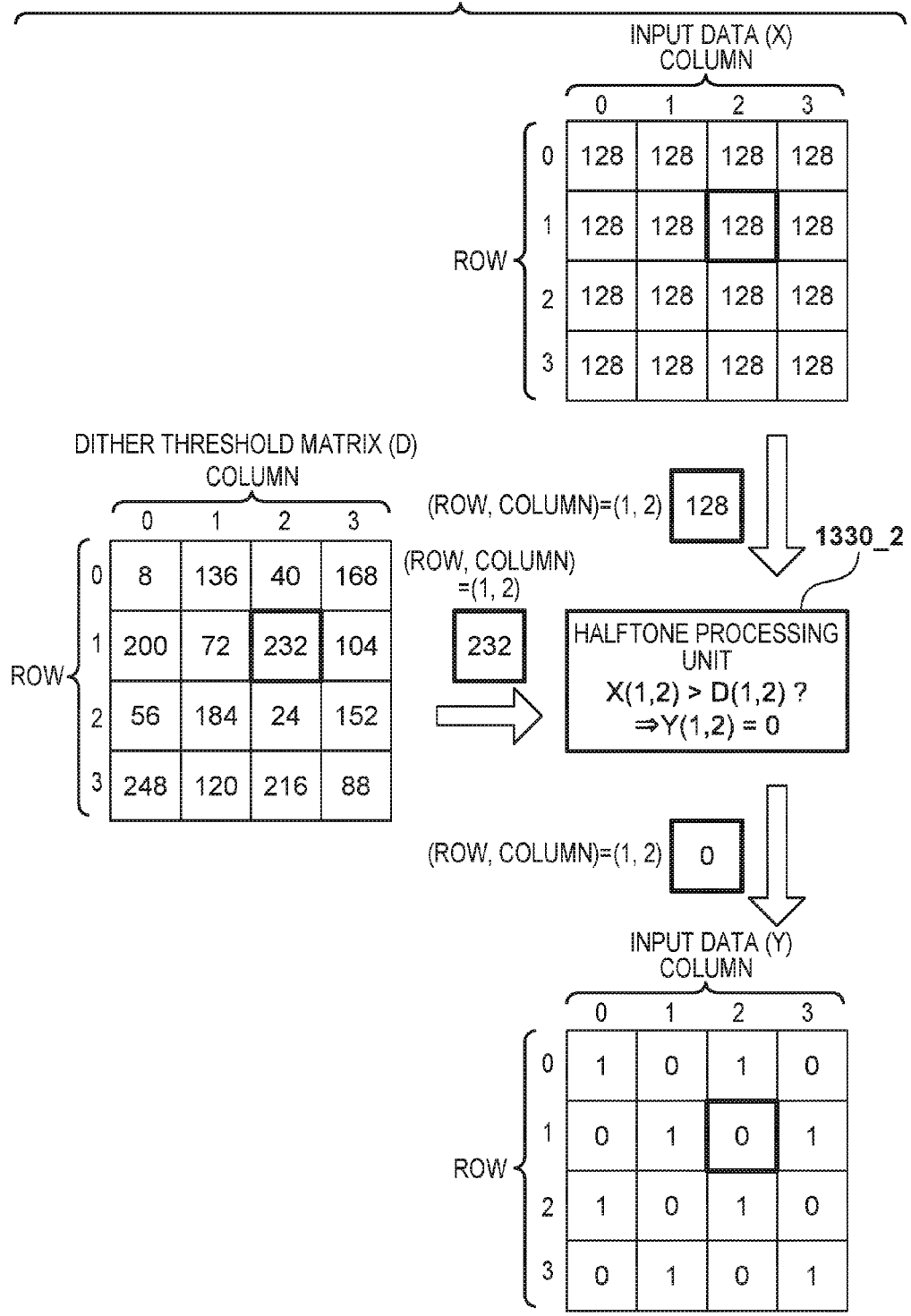
FIG. 10 is a simple illustrative diagram of halftone processing.

For example, the halftone processing unit 1330_2 uses a Bayer dither threshold matrix shown in FIG. 10, and generates a binary image based on whether or not the value of a pixel is smaller than a dither threshold stored at the coordinates corresponding to the pixel in the dither threshold matrix. To simplify the description, FIG. 10 shows how to calculate output data for a 4×4 threshold matrix when reading 4×4 input data.

For example, in the case of performing halftone processing in FIG. 10 on a pixel (1, 2) in the first row and second column in the 4×4 pixels, a dither threshold matrix D(1, 2) at the same position=232 is read out for the input data X(1, 2)=128. Furthermore, when these values are compared, X(1, 2)>D(1, 2) is FALSE, and accordingly the output data Y(1, 2)=0. Thus, the halftone processing unit 1330_2 reads in the input data from the filtering processing unit 132, and also simultaneously reads out the dither threshold data from the dither threshold matrix SRAM.

Also, when performing processing for one page, the halftone processing unit 1330_2 repeatedly applies this 4×4 dither threshold matrix in the main scanning direction, as shown in FIG. 11. Although a plurality of dither threshold matrixes appear to be provided in FIG. 11, in practice, one dither threshold matrix is repeatedly used. SRAM access is controlled so that, after the right end of the dither threshold matrix has been accessed, the address to be accessed is returned to the left end again. In this case, processing for one page is executed successively for one line in the main scanning direction, and proceeds to the next line. Accordingly, on the first line, D(0, 0) to (0, 3) in the dither threshold matrix are repeatedly accessed.

Furthermore, if the same dither threshold matrix is used for all of the CMYK colors in color halftone processing, the pattern will have a specific cycle. Accordingly, if an output image position of any color distorts due to device properties or the like, colors are more likely to interfere, and moire may occur when colors are overlaid. For this reason, it is desirable, as shown in FIG. 12, to change the screen angle, starting position, or the like of the dither threshold matrix for the respective colors, e.g. to shift, for the color C, the starting position by one pixel when repeating the dither threshold matrix on the side in the sub-scanning direction, and to shift, for the color Y, the starting position by two pixels, or start readout from the second line for the color Y.

Furthermore, the n×n size of the dither threshold matrix may be changed for the respective colors, and for example, a dither threshold matrix of a size of n×m may also be used. As a result, as to the readout access to the dither threshold matrix SRAM, readout is repeated for the respective colors over the size in the main scanning direction (=n) of the dither threshold matrix in the main scanning direction. Meanwhile, there is a characteristic in that, for example, readout in the sub-scanning direction is started while shifting the start position by k pixels after readout over the size in the sub-scanning direction (=m) of the dither threshold matrix has been finished.

That is to say, in this image processing data transfer control, access is repeated so that the address to be accessed is sequentially incremented within a certain range in the main scanning direction and is then returned to the initial address. On the next line, access is started from another address, and similarly, access is performed so that the address to be accessed is sequentially incremented within a certain range in the main scanning direction and is then returned to the initial address. Accordingly, the image processing algorithm for halftone processing can be considered to be data transfer control in which the address to be accessed is predictable in two-dimensional directions including the main scanning direction and sub-scanning direction.

In view of this point, according to the present invention, power saving control for SRAMs is performed so that the RS mode is applied to a range other than the range that needs to be accessed in the dither threshold matrix, and only a certain range is set to the normal mode in the main scanning direction in which access is repeatedly performed. This enables convenient control to be performed by further combining a sub-scanning counter to the configuration in which the SRAM_RS control unit includes the main scanning counter described in the first embodiment. In addition, due to the characteristic of repeated access to the dither threshold matrix in the main scanning direction, needless to say that control is further simplified by matching the divisor b for the SRAM areas to the dither threshold matrix.

As described above, in the case of combining this embodiment with image processing in which a two-dimensional table, such as the dither threshold matrix, is accessed, the address to be accessed in the dither threshold matrix is predicted. Furthermore, power saving control for each area is performed so that only an area related to the predicted address is set to the normal mode, and other areas are set to the RS mode. With this configuration, in halftone processing as well, the same power saving control as that in the first embodiment can be implemented, and improved power saving control can be provided.

Although a dither threshold matrix configuration with 4×4 pixels has been described above for simplification, usually, a dither threshold matrix of 8×8 or more pixels is commonly used. For example, in the case of using a dither threshold matrix of 32×32 pixels (1024 words), if areas are set in units of 32 words, it means that the dither threshold matrix is divided into 1024÷32=32 areas. Accordingly, 1/32 of the dither threshold matrix can be operated in the normal mode, and the remaining 31/32 area can be operated in the RS mode, thereby being able to reduce power consumption.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-184687 filed on Sep. 21, 2016, which is hereby incorporated by reference herein in its entirety.

What is claimed is:

1. An information processing apparatus comprising:
a plurality of memory modules that can be controlled in a first mode in which power is supplied and in a second mode in which power consumption is smaller than in the first mode;
a main scanning counter configured to adjust a timing of processing image data in the main scanning direction thereof, and
a controller configured to specify a memory module to be accessed based on input address information, shift the specified memory module from the second mode to the first mode, and, upon access to the specified memory module being terminated, shift the specified memory module from the first mode to the second mode,
wherein each memory module is a line buffer configured to hold data individually in respective lines in a main scanning direction of image data to be subjected to image processing, and
wherein the controller performs power saving control individually for the respective memory modules in accordance with the specified memory module and a count by the main scanning counter.

2. The information processing apparatus according to claim 1,
wherein, at a count a predetermined number before a specific count by the main scanning counter at which the specified memory module is to be accessed, the controller controls the specified memory module to shift from the second mode to the first mode.

3. The information processing apparatus according to claim 2,
wherein the count the predetermined number before the specific count is based on a period required for the specified memory module to transition from the second mode to the first mode.

4. The information processing apparatus according to claim 1,
wherein the image processing is filtering processing, and the controller predicts transition in the main scanning direction, of the memory module to be accessed.

5. The information processing apparatus according to claim 1,
wherein the memory modules are SRAMs.

6. A method for controlling an information processing apparatus including a plurality of memory modules that can be controlled in a first mode in which power is supplied and in a second mode in which power consumption is smaller than in the first mode, and a main scanning counter configured to adjust a timing of processing image data in the main scanning direction thereof, the method comprising:
specifying a memory module to be accessed based on input address information, and shifting the specified memory module from the second mode to the first mode; and
shifting, upon access to the specified memory module being terminated, the specified memory module from the first mode to the second mode,
wherein the method further comprises performing power saving control individually for the respective memory modules in accordance with the specified memory module and a count by the main scanning counter.

7. An information processing apparatus comprising:
a plurality of memory modules each having a plurality of areas that can be controlled in a first mode in which power is supplied and in a second mode in which power consumption is smaller than in the first mode;
a main scanning counter configured to adjust a timing of processing image data in the main scanning direction thereof; and
a controller configured to specify an area to be accessed based on input address information, shift the specified area from the second mode to the first mode, and, upon access to the specified area being terminated, shift the specified area from the first mode to the second mode,
wherein the memory modules are line buffers configured to hold data individually in respective lines in a main scanning direction of image data to be subjected to image processing, and are each divided into the plurality of areas, and
wherein the controller performs power saving control individually for the respective areas of the memory modules in accordance with the specified area and at count by the main scanning counter.

8. The information processing apparatus according to claim 7,
wherein, at a count a predetermined number before a specific count by the main scanning counter at which the specified area is to be accessed, the controller controls the specified area to shift from the second mode to the first mode.

9. The information processing apparatus according to claim 8,
wherein the count the predetermined number before the specific count is based on a period required for the specified area to transition from the second mode to the first mode.

10. The information processing apparatus according to claim 7,
wherein the image processing is filtering processing, and the controller predicts, for each memory module, transition in the main scanning direction of an area, of the plurality of areas, to be accessed.

11. The information processing apparatus according to claim 7,
wherein the memory modules are line buffers configured to hold data individually in respective lines in a main scanning direction of image data to be subjected to image processing, the areas are two-dimensional areas spanning the plurality of memory modules, and the memory modules are each divided into the plurality of areas at predetermined addresses.

12. The information processing apparatus according to claim 11, further comprising:
a main scanning counter configured to adjust a timing of processing image data in the main scanning direction thereof; and
a sub-scanning counter configured to adjust a timing of processing the image data in a sub-scanning direction thereof,
wherein the controller performs power saving control individually for the respective areas spanning the plurality of memory modules in accordance with the specified area, a count by the main scanning counter, and a count by the sub-scanning counter.

13. The information processing apparatus according to claim 12,
wherein the image processing is halftone processing, and the controller predicts, for each memory module, transition of an area to be accessed in the main scanning direction and the sub-scanning direction.

14. The information processing apparatus according to claim 13,
wherein the areas correspond to a dither threshold matrix to be used in the halftone processing.

15. The information processing apparatus according to claim 7,
wherein the memory modules are SRAMs.

16. A method for controlling an information processing apparatus including a plurality of memory modules each having a plurality of areas that can be controlled in a first mode in which power is supplied and in a second mode in which power consumption is smaller than in the first mode, and a main scanning counter configured to adjust a timing of processing image data in the main scanning direction thereof, the method comprising:
specifying an area to be accessed based on input address information;
shifting the specified area from the second mode to the first mode; and,
shifting, upon access to the specified area being terminated, the specified area from the first mode to the second mode,
wherein the memory modules are line buffers configured to hold data individually in respective lines in a main scanning direction of image data to be subjected to image processing, and are each divided into the plurality of areas, and
wherein the method further comprises performing power saving control individually for the respective areas of the memory modules in accordance with the specified area and a count by the main scanning counter.

* * * * *